United States Patent
De La Bardonnie et al.

(10) Patent No.: US 9,932,103 B2
(45) Date of Patent: Apr. 3, 2018

(54) CONTROL METHOD AND DEVICE FOR AIRCRAFT DOOR AND AIRCRAFT DOOR INCORPORATING SAME

(71) Applicant: RATIER FIGEAC, Figeac (FR)

(72) Inventors: Jean De La Bardonnie, Vindelle (FR); Eric Delbos, Lacapelle-Marival (FR); Bertrand Prouzet, Figeac (FR)

(73) Assignee: RATIER FIGEAC, Figeac (FR)

( * ) Notice: Subject to any disclaimer, the term of this patent is extended or adjusted under 35 U.S.C. 154(b) by 163 days.

(21) Appl. No.: 14/982,804

(22) Filed: Dec. 29, 2015

(65) Prior Publication Data
US 2016/0185441 A1 Jun. 30, 2016

(30) Foreign Application Priority Data
Dec. 31, 2014 (FR) .................................. 14 63514

(51) Int. Cl.
*B64C 1/20* (2006.01)
*B64C 1/14* (2006.01)
*B64C 1/24* (2006.01)

(52) U.S. Cl.
CPC .............. *B64C 1/1423* (2013.01); *B64C 1/24* (2013.01)

(58) Field of Classification Search
CPC .................................. B64C 1/14; B64C 1/1423
See application file for complete search history.

(56) References Cited

U.S. PATENT DOCUMENTS

| | | | |
|---|---|---|---|
| 2,931,599 A | 4/1960 | McQuilkin | |
| 4,086,726 A | 5/1978 | Moses | |
| 4,914,859 A * | 4/1990 | Gionet | B66B 13/143 49/25 |
| 7,342,374 B2 * | 3/2008 | Robb | G05B 19/351 318/266 |
| 2002/0150278 A1* | 10/2002 | Wustefeld | G06K 9/2036 382/103 |
| 2010/0127124 A1* | 5/2010 | Yada | B64C 1/1461 244/118.3 |
| 2011/0139934 A1* | 6/2011 | Giesa | B64D 25/14 244/137.2 |
| 2013/0318873 A1* | 12/2013 | Knijnenburg | B64C 1/1407 49/31 |
| 2014/0345396 A1* | 11/2014 | Riedel | B64D 25/14 73/865.4 |

(Continued)

FOREIGN PATENT DOCUMENTS

EP 2108585 A1 10/2009

*Primary Examiner* — Richard G Davis
(74) *Attorney, Agent, or Firm* — Volpe and Koenig, P.C.

(57) ABSTRACT

A device and a control method are described for a swinging aircraft door (3), mobile around a swinging axis (21) substantially parallel to the longitudinal axis of the aircraft via a motorized mechanism and having integrated boarding stairs (31). The method includes the capture of electromagnetic or ultrasonic radiation using at least one sensor (401, 501); the detection of something on the stairs on the basis of captured electromagnetic or ultrasonic radiation, in order to deduce therefrom whether a detection condition is satisfied or not; and, driving of the motorized mechanism in order to control the closure of the door in response to a closure command except in case of detection of something on the stairway.

14 Claims, 3 Drawing Sheets

(56) References Cited

U.S. PATENT DOCUMENTS

| | | | |
|---|---|---|---|
| 2015/0307208 A1* | 10/2015 | Butler, III | B64C 1/1407 348/144 |
| 2016/0090196 A1* | 3/2016 | Besettes | B64C 1/1407 244/129.5 |

* cited by examiner

CONTROL METHOD AND DEVICE FOR AIRCRAFT DOOR AND AIRCRAFT DOOR INCORPORATING SAME

FIELD OF THE INVENTION

The present invention relates generally to aviation and more specifically to business aviation. In particular it relates to a control method and device for aircraft door, in particular business aircraft or business helicopter, for example for VIP transport and also an aircraft door incorporating such a device.

BACKGROUND

In the aviation industry, business aircraft (e.g. "business jets") are classified into several categories or classes of aircraft: very light business aircraft, light business aircraft, midsize business aircraft, etc. Commercially they are used to transport a small number of passengers (in general at most a few tens).

Whatever the class thereof, business aircraft have at least one door, in particular the cabin access door, comprising, on one surface oriented towards the inside of the aircraft in a closed position thereof, stairs having treads and risers. The access door opens and closes by pivoting around a substantially horizontal axis parallel to the centerline of the aircraft, meaning the fixed reference line corresponding to the longitudinal axis thereof.

The trend is to replace the opening/closing maneuver of the door currently done manually by an operator positioned inside the aircraft near the door by an automatic operation performed by a properly controlled motorized mechanism. In this context, the opening/closing operation of the door could be controlled without the operator having direct visibility of the door itself, for example from the cockpit of the aircraft by one of the cockpit crew members and not by a commercial crew member.

To avoid the risk of closure at the door when, for example, a person or an object is still located on the open door, specifications require the use of security devices with which to detect an abnormal load (for example around 30 pounds, or 13.6 kg) present on the door at the moment of initiating the door closure sequence and inhibiting it.

Such known safety devices operate by comparison of a threshold and a current value in an electric drive motor for the door which reflects the torque delivered by the motor. Exceeding the threshold indicates an abnormal force needed for starting the door closure sequence. In that case, it is concluded that a load is present on the door and the sequence is immediately interrupted. This type of device gives an indirect detection of the presence of a load.

With reference to the attached drawings, FIG. 1A schematically shows an example of system 1 for opening/closing an aircraft door integrated in the inner wall 2 of the aircraft. Similarly, FIG. 1B shows a system of the same type, but integrated into the door 3 of the aircraft. FIG. 1C is a functional diagram of the main elements of the control system 1.

Door 3 of the aircraft is a swinging door mobile around a swinging axis 21 substantially parallel to the longitudinal axis (centerline) of the aircraft. The door 3 has integrated boarding stairs 31 on the surface thereof turned towards the inside of the aircraft in closed position of the door. The stairs 31 comprise respectively associated treads 32 and risers 33.

The door 3 can swing around the axis 21 from an open position to a closed position, or vice versa, because of a motorized mechanism. In closed position, the door 3 blocks the opening which is provided in the inner wall 2 for boarding, meaning for access on board the aircraft. In completely open position, the stairs 31 in fact allow access onboard the aircraft by the users (e.g. crewmembers, passengers, etc.) from the airport tarmac 300.

The door opening/closing system 1 includes an electric box 100 for opening/closing the door 3. In the example shown, the box 100 contains a pulley 101 driving the cable 103 for maneuvering the door 3 of the aircraft.

In the case from FIG. 1A, the box 100 is placed in the inner wall 2. The cable 103 is coupled to the door 3 by passing for example over a guide pulley 104 which is rigidly connected with the inner wall 2. Under the force of the traction exerted via the cable 103 by the pulley 101 when it is turned in a set direction, the door moves from the closed position to the open position. Inversely, when the pulley 101 turns in the other direction, the door moves from the open position to the closed position.

In the case from FIG. 1B, the box 100 is placed in the door 3. The cable 103 is then coupled to the inner wall 2. Under the force of the traction exerted via the cable 103 by the pulley 101 when it is turned in a set direction, the door moves from the open position to the closed position. Inversely, when the pulley 101 turns in the other direction, the door moves from the closed position to the open position.

In the embodiments described above, the mechanical coupling between the door 3 and the electric box 100 is done by a pulley 101 and a cable 103. Other embodiments can of course be provided for coupling the mechanical rotational movement of the door 3 to the control box 100.

With reference to the functional diagram from FIG. 1C, whatever the system architecture, i.e. whether it incorporates the inner wall 2 as shown in FIG. 1A or it incorporates the door 3 as shown in FIG. 1B, the pulley 101 is moved by a motorized mechanism 102. The mechanism 102 is driven by a driving unit 105. The unit 105 is paired with a unit 106 for monitoring the current in the motorized mechanism 102. On command from the operator, the driving unit 105 drives the motorized mechanism 102 which controls the pulley 101 for winding/unwinding of the cable 103. The winding of the cable 103 leads to the closure of the door. Inversely, the unwinding of the cable leads to the opening of the door.

During closure of the door, the current consumption in the motorized mechanism 102 reflects the torque that has to be generated in order to close the door. In case of exceeding a set current threshold, the monitoring unit 106 generates a signal for detection of an abnormal load on the door which is sent to the driving unit 105. In response to this detection signal, the driving unit stops the closure of the door, and could possibly command the reopening thereof, via commands that it applies to the motorized mechanism 102.

However the value of the load to be detected is small compared to the mass of the door to be moved. Additionally, it is small compared to the equivalent force that the wind, for example, can produce on the door. Finally, the mass of the door can be different from one aircraft to another, even of identical brands and models, depending on the selected options.

In other words, many factors can impact the value of the current in the motorized mechanism 102, independent of the presence or not of a load on the door 3. These factors vary from the condition of the system itself (e.g. mechanical friction) to meteorological conditions (e.g. wind, temperature) by way of the power supply network voltage (in principle equal to 28 V in the aircraft, but subject to inevitable variations depending in particular on conditions of use).

All these reasons can lead to false alarms or, inversely, to the failure to detect the presence of people or objects on the door, according to the adjustments of the system. Additionally, not only is the definition of the initial parameters difficult, but additionally the inevitable drifts over time can generate significant false alarm rates.

SUMMARY

The invention aims to eliminate, or at least attenuate, all or part of the aforementioned disadvantages from the prior art.

For this purpose, a first aspect of the invention proposes to make not only a physical measurement but a direct observation of the door stairs, either by electromagnetic means, for example optical in the visible spectrum and/or in the infrared spectrum, or by acoustic means, for example ultrasound.

Thus, the invention relates to a swinging aircraft door, mobile around a swinging axis substantially parallel to the longitudinal axis of the aircraft via a motorized mechanism and having integrated boarding stairs, where the door comprises a control device. The device includes:

at least one sensor suited for detecting electromagnetic or ultrasonic radiation;

a detection unit configured for detecting something on the stairs by reacting to the captured electromagnetic or ultrasonic radiation in order to deduce whether a detection condition is met; and a driving unit for the motorized mechanism configured in order to control the closure of the door in response to a closure command except in case the detection device detects something on the stairs.

Detection of something on the stairs can be done before initiating closure of the door and/or during that closure. Thus, even if a passenger steps on the stairs once door closure is initiated, the device can react by blocking the continuation of closure of the door.

According to the embodiments, taken alone or in combination, additionally:

the detection unit is configured in order to analyze the captured electromagnetic or ultrasonic radiation compared to set signals;

the sensor is an imaging device arranged for capturing images of the stairs, and a detection unit including means of image analysis configured for analyzing an image captured by the imaging device;

the means of image analysis are configured in order to compare an image captured by the imaging device with a set reference image;

the reference image corresponds to an image of the stairs captured by the imaging device without a person or object on the stairs;

the sensor is an ultrasonic transducer arranged for capturing an ultrasonic wave reflected by a person or object present on the stairs; and/or the elements of the detection unit are included in the sensor and/or in the driving unit.

Since the stairs have treads and risers, the sensor for the control device can be integrated into one of the risers located at one end of the stairs on the side of the axis of swinging of the door, and pointing towards the other end of the stairs, opposite the axis of swinging of the door.

According to the embodiments, taken alone or in combination, additionally:

since the door has a leaf and a frame, the sensor of the control device is an imaging device incorporated in the jamb of the doorframe and points towards the stairs;

since the stairs have treads and respectively associated risers, the control device includes one or more ultrasonic transducers respectively integrated into the risers and each arranged for monitoring one or more treads, for example the tread or treads immediately downward on the stairs; in another example, the device includes at least one ultrasonic transducer respectively integrated in the risers associated with the treads to be monitored; and/or since the stairs have treads and at least one closed stringer, the detection unit includes one or more ultrasonic transducers respectively integrated in the stringer and each arranged for monitoring one or more treads, for example the one or more treads immediately downward on the stair; in another example, the device includes at least one ultrasonic transducer respectively integrated into the stringer near each of the treads to be monitored.

A second aspect of the invention relates to a control method for a swinging aircraft door, mobile around a swinging axis substantially parallel to the longitudinal axis of the aircraft via a motorized mechanism and having integrated boarding stairs, where the method comprises:

the capture of electromagnetic or ultrasonic radiation using at least one sensor;

the detection of something on the stairs on the basis of captured electromagnetic or ultrasonic radiation, in order to deduce therefrom whether a detection condition is satisfied or not; and driving of the motorized mechanism in order to control the closure of the door in response to a closure command except in case of detection of something on the stairway.

According to the embodiments of the process, taken alone or in combination, additionally:

the sensor is an imaging device arranged for capturing images of the stairs, so the detection of something on the stairs includes the comparison of an image captured by the imaging device with a reference image;

the reference image corresponds to a control image of the stairs captured by the imaging device without a person or object on the stairs; and/or since the sensor is an ultrasonic transducer, the detection of something on the stairs includes the analysis of an ultrasonic wave reflected by a person or object present on the stairs.

BRIEF DESCRIPTION OF THE DRAWINGS

Other features and advantages of the invention will again appear upon reading the following description. This is purely illustrative and must be read with reference to the attached drawings in which.

DETAILED DESCRIPTION OF THE PREFERRED EMBODIMENTS

In the present description and in the figures from the drawings, the same elements bear the same references.

Figure 1A:
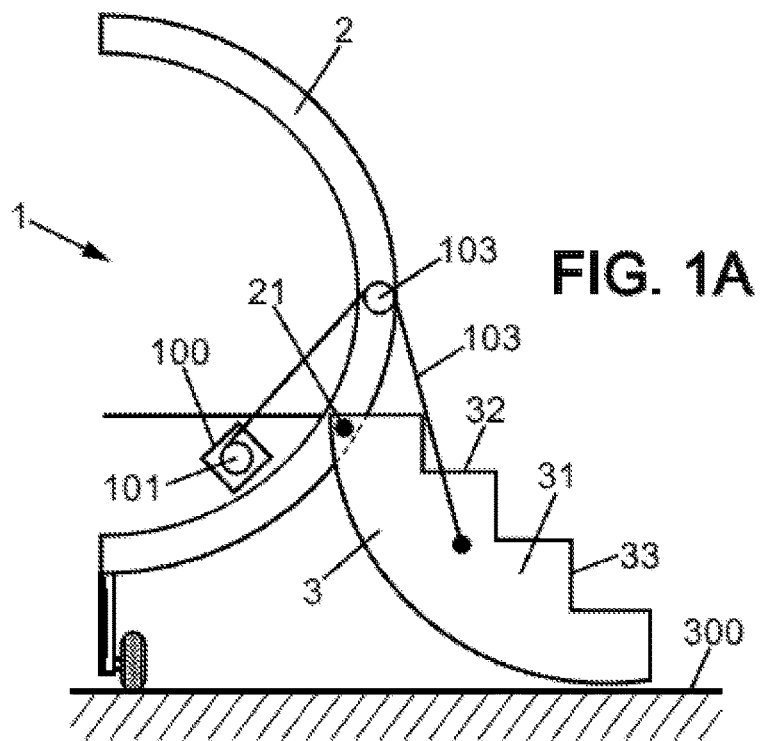
FIGS. 1A and 1B, already analyzed, are schematic drawings showing the general architecture of an aircraft door control system integrated into the inner wall of an aircraft or in the door, respectively.
Figure 1B:
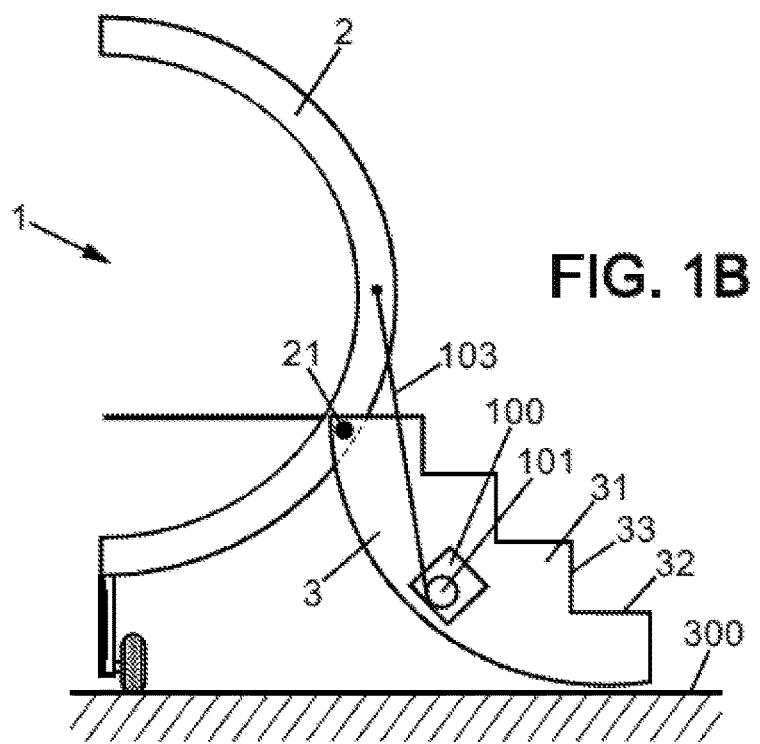

The embodiments which are now going to be presented applied to a system 1 for opening/closing an aircraft door which can be integrated into the inner wall 2 of the aircraft as described above with respect to FIG. 1A, or integrated into the door 3 of the aircraft as described above with respect to FIG. 1B.

Figure 1C:
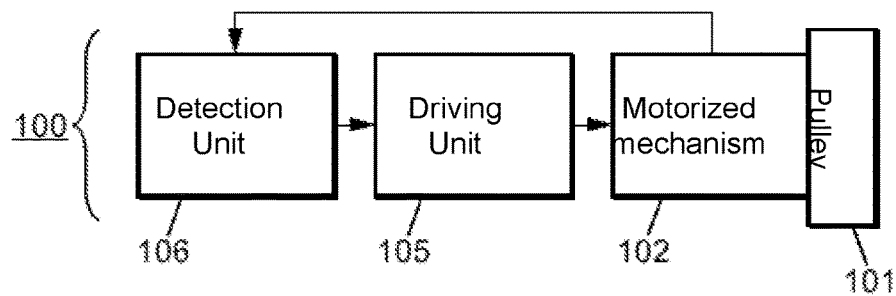
FIG. 1C, also already analyzed, is a functional diagram of the architecture of the control system according to the prior art.
Figure 2:
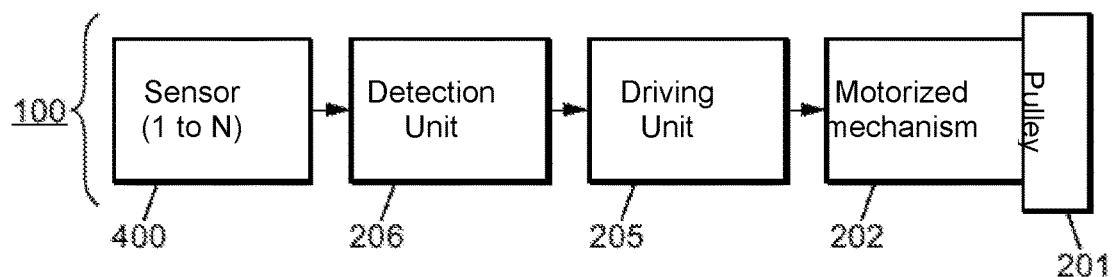
FIG. 2 is a functional diagram of the control system architecture according to embodiments.

FIG. 2 is a functional diagram showing the main elements of the control system 1. Among these elements, the pulley 101, the motorized mechanism 102 and the driving unit 205 substituting for the driving unit 105 from FIG. 1C and the detection unit 206 substituting for the detection unit 106 from FIG. 1C are for example incorporated in the electronic box 100. Other integration schemes are of course conceivable. For example the driving unit 205 can be part of a functional unit integrating other functions than those associated with managing open/closing of the door and can in that way be integrated elsewhere in the aircraft. Additionally, the detection, driving and motorized mechanism functions can be grouped in only one or several boxes according to integration constraints.

Compared to the architecture of the system according to the prior art described in the introduction with reference to the functional diagram from FIG. 1C, the functional architecture of the system as proposed includes a sensor function 400. From a structural perspective, this sensor function is performed by a set number of sensors, included between 1 and N, where N is an integer number strictly greater than one.

An information processing function of information provided by this sensor or these sensors is included in the detection unit 206. This unit is configured to send corresponding alarm signals to the driving unit 205. The motorized mechanism 102 which drives the pulley 101 winding the cable 103 is not different from the mechanism from the architectures in the prior art.

Figure 3:
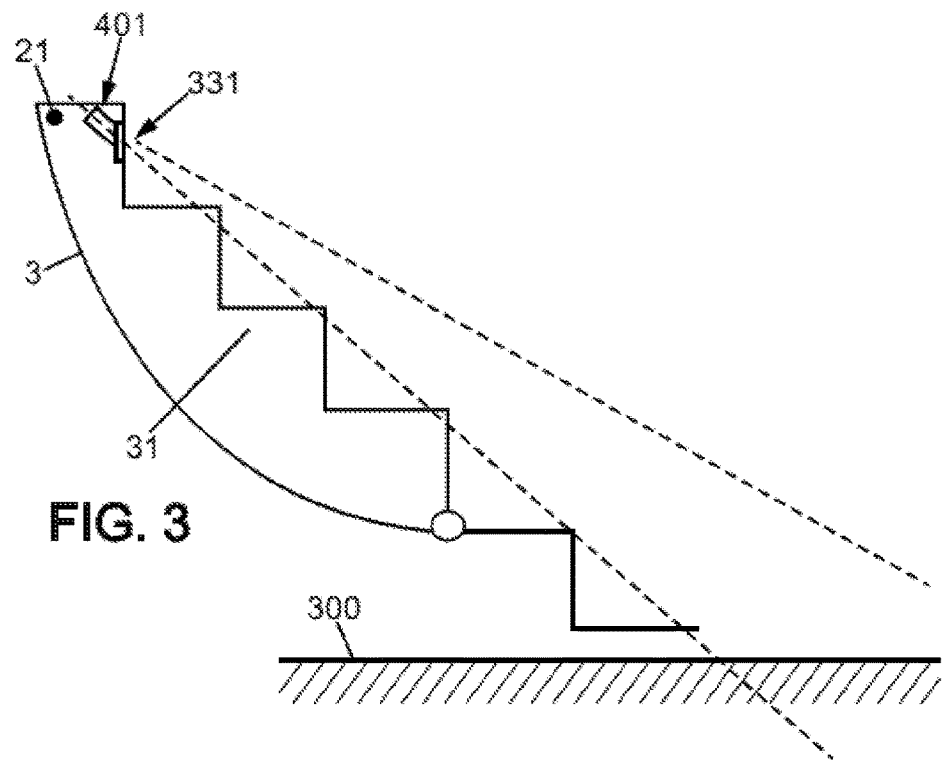
FIG. 3 is drawing of a first embodiment.

FIG. 3 shows a first implementation example with a single sensor 401 which is an imaging device arranged for capturing an image of the stairs. In the example shown, the imaging device 401 is arranged in the top riser 331 of the area of the stairs 31 to be monitored, meaning the riser closest to the axis 21 of swinging of the door 3. In this configuration, the entirety of the stairs 31 is monitored by the imaging device. But as a variant, the imaging device 401 can be arranged in another riser, lower down in the stairs 31 in order to monitor only the lower portion of the stairs. As another variant, more than one imaging device, such as the imaging device 401, can be provided each respectively arranged in one riser of the stairs 31. The respective parts of the stairs, each of which is the part directly down from the corresponding imaging device, can then be monitored.

The imaging device 401 operates for example in the visible or infrared spectrum. The imaging device can use for example CMOS (Complementary Metal Oxide Semiconductor), CCD (Charge Coupled Device) or other technology.

The detection unit includes means of image analysis configured for extracting the signal for detection of something on the door, either directly from the captured image through an algorithm of the type for image monitoring, or by comparison of the captured image with a set image, or else by comparison of the image with a control image previously recorded without any person or object on the stairs. Such a control image can be acquired by the imaging device 401, for example during a prior learning phase with which each initialization phase can began, for example until the end of the door opening phase.

As a variant, the imaging device 401 can also be attached to the inner wall 2 of the aircraft. It may, for example, be integrated into the structure (frame) of the door above the opening provided for the door 3. This can provide a better angle of view for the imaging device 401 on the stairs 31, by being less constrained by the noses of the treads which could mask an area of the tread directly below.

Figure 4:
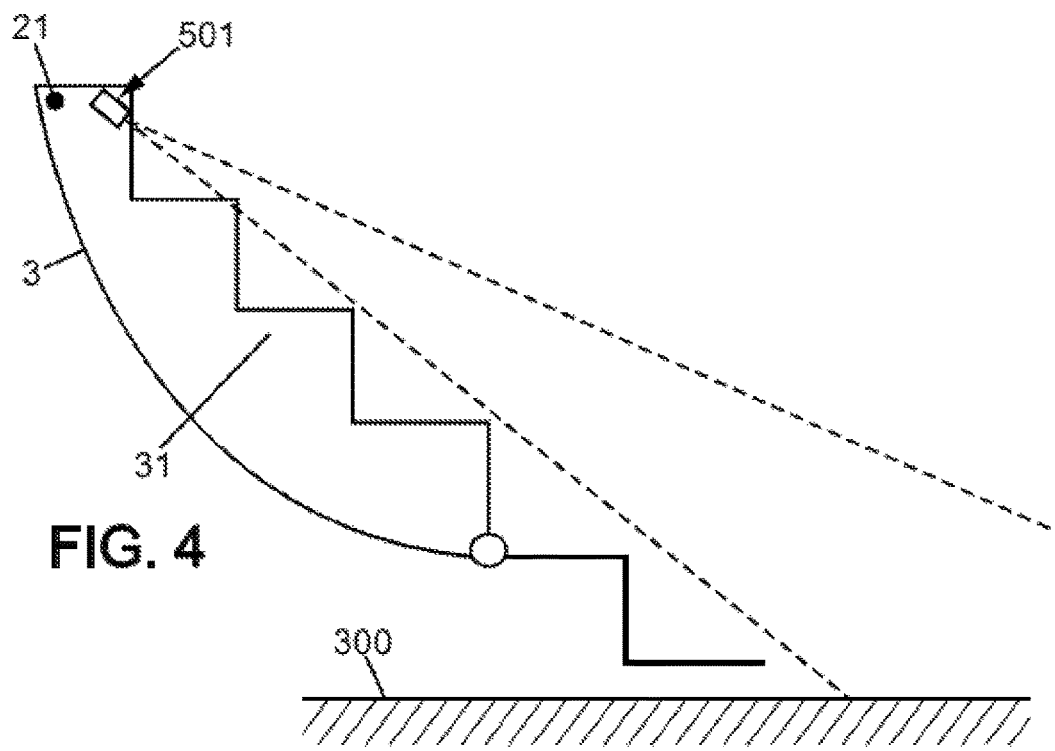
FIG. 4 is drawing of a second embodiment.

FIG. 4 shows a second embodiment with only one acoustic sensor 501, for example arranged in the highest riser of the area of the stairs to be monitored. More specifically, the sensor 501 can be integrated into the riser located at the end of the stairs 31 next to the axis 21 of swinging of the door 3 and point towards the other end of the stairs, opposite said axis of swinging of the door. In this configuration, all of the stairs can be monitored by the sensor 501.

The sensor is for example an ultrasonic transducer, where the detection of something on the stairs by the detection unit 206 includes the analysis of an ultrasonic wave reflected by a person or object present on the stairs.

The sensor 501 preferably has a fairly long detection range and the detection unit 206 can advantageously perform processing in order to not consider fixed echoes coming from the treads and ramps but also possibly something on the tarmac 300 near the stairs 31 at the time of closing. The sensor 501 can also be arranged in a riser associated with a lower tread i.e. farther away from the axis of swinging 21 of the door 3 in order to only monitor the lower portion of the stairs 31.

Figure 5:
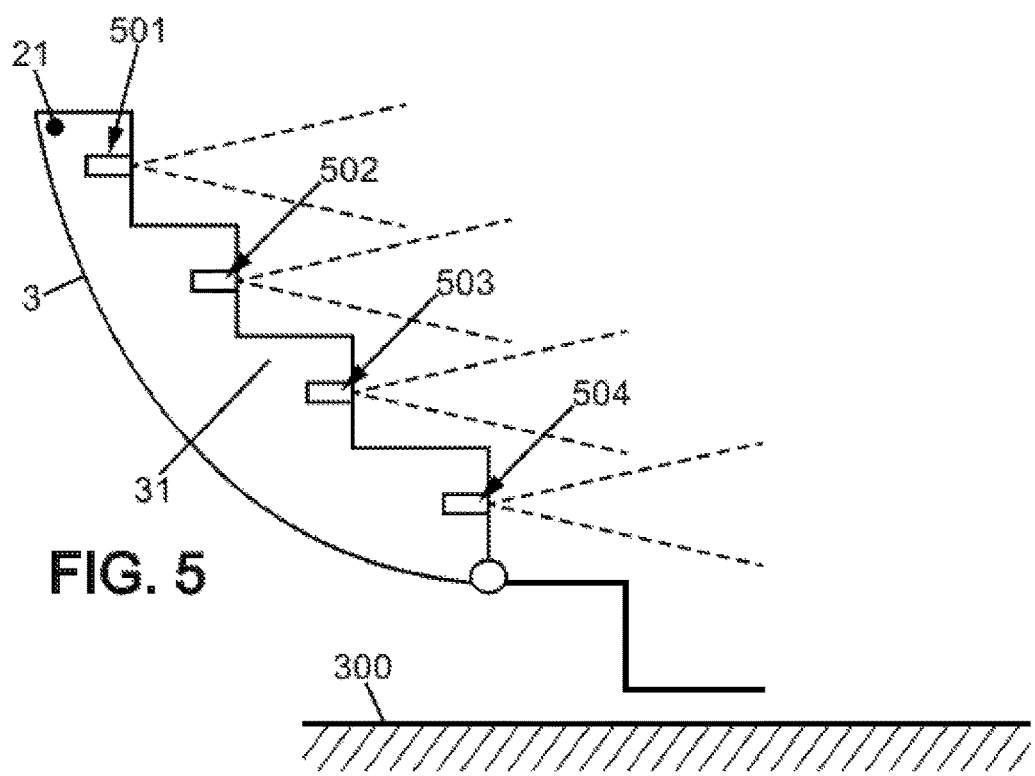
FIG. 5 is drawing of a third embodiment.

FIG. 5 shows a third implementation example with several acoustic sensors 501, 502, 503 and 504, at least one per step to be monitored. This allows the use of very short range sensors, for example like those used in car bumpers and therefore overcomes problems of fixed echoes. If the stairs 31 are equipped with a closed stringer, the sensors can be integrated into this stringer near each of the treads to be monitored, respectively. Arranged in that way, they serve to scan the tread longitudinally, meaning along the longitudinal axis of the tread, which is orthogonal to the axis of ascending/descending the stairs 31.

The invention also relates to a swinging aircraft door, mobile around a swinging axis substantially parallel to the longitudinal axis of the aircraft via a motorized mechanism and having integrated boarding stairs, where the door comprises a control device 1 such as described above.

The present invention which was described and illustrated in the present detailed description and in the Figures is not limited to the embodiment shown. Other variants and embodiments can be deduced and implemented by the person skilled in the art upon reading the present description and the attached Figures.

For example, the distinction between the sensor(s), the detection unit and the driving unit illustrated in FIG. 3 can be a purely functional distinction. In particular, the (or some of the) elements of the detection unit can be included in the sensor(s) or in the driving unit, or be distributed among the sensor(s) and driving unit, according to the specificities particular to each application of the invention.

In the claims, the term "comprising" does not exclude other elements or other steps. The various features presented and/or claimed can advantageously be combined. Their presence in the description or in the various dependent

What is claimed is:

1. A swinging aircraft door, mobile around a swinging axis substantially parallel to the longitudinal axis of an aircraft via a mechanism comprising an electric motor and having integrated boarding stairs, and a control device comprising:
  at least one sensor configured to capture electromagnetic or ultrasonic radiation;
  a processor configured to determine if a person or an object is present on the stairs by reacting to the captured electromagnetic or ultrasonic radiation in order to deduce whether a detection condition is met; and
  a controller configured to control the electric motor in order to control the closure of the door in response to a closure command except if the processor determines that a person or an object on the stairs,
  wherein the processor is included in at least one of the at least one sensor or the controller, and
  wherein the stairs comprise treads and risers and the at least one sensor is integrated into one of the risers.

2. The aircraft door according to claim 1, wherein the processor is configured to analyze the captured electromagnetic or ultrasonic radiation compared to set signals.

3. The aircraft door according to claim 1, wherein the sensor is an imaging device configured to capture images of the stairs, and wherein the processor is configured to analyze an image captured by the imaging device.

4. The aircraft door according to claim 3, wherein the processor is configured to compare an image captured by the imaging device with a set reference image.

5. The aircraft door according to claim 4, wherein the reference image corresponds to an image of the stairs captured by the imaging device without a person or object on the stairs.

6. The aircraft door according to claim 1, wherein the sensor is an ultrasonic transducer configured to capture an ultrasonic wave reflected by a person or object present on the stairs.

7. The aircraft door according to claim 1, wherein, the sensor of the control device can be integrated into one of the risers located at one end of the stairs on a side of the axis of swinging of the door, and points towards an end of the stairs, opposite the axis of swinging of the door.

8. The aircraft door according to claim 1, wherein the control device includes at least one ultrasonic transducer respectively integrated into the risers and each arranged for monitoring at least one tread.

9. The aircraft door according to claim 1, wherein the stairs comprise at least one closed stringer, and the processor includes at least one ultrasonic transducer respectively integrated in the at least one stringer and each arranged for monitoring at least one tread.

10. A control method for a swinging aircraft door, mobile around a swinging axis substantially parallel to the longitudinal axis of the aircraft via a mechanism comprising an electric motor and having integrated boarding stairs comprising treads and risers, where the method comprises:
  capturing electromagnetic or ultrasonic radiation using at least one sensor integrated into one of the risers;
  detecting a person or an object on the stairs on the basis of captured electromagnetic or ultrasonic radiation, in order to deduce therefrom whether a detection condition is satisfied or not; and
  controlling the electric motor in order to control the closure of the door in response to a closure command except in case of detection of a person or object on the stairs.

11. The control method according to claim 10, wherein the sensor is an imaging device configured to capture images of the stairs, the detection of a person or object on the stairs includes the comparison of an image captured by the imaging device with a reference image.

12. The control method according to claim 11, wherein the reference image corresponds to a control image of the stairs captured by the imaging device without a person or object on the stairs.

13. The control method according to claim 10 wherein, the sensor is an ultrasonic transducer, the detection of something on the stairs includes the analysis of an ultrasonic wave reflected by a person or object present on the stairs.

14. A swinging aircraft door, mobile around a swinging axis substantially parallel to the longitudinal axis of an aircraft via a mechanism comprising an electric motor and having integrated boarding stairs, and a control device comprising:
  at least one sensor configured to capture electromagnetic or ultrasonic radiation;
  a processor configured to determine if a person or an object is on the stairs by reacting to the captured electromagnetic or ultrasonic radiation in order to deduce whether a detection condition is met; and
  a controller configured to control the electric motor in response to a closure command except if the first processor determines that a person or an object on the stairs,
  wherein the processor is included in at least one of the at least one sensor or the controller, and
  wherein the door has a leaf and a frame and the sensor of the control device is an imaging device incorporated in a jamb of the doorframe and points towards the stairs.

* * * * *